U S005605082A

United States Patent [19]
Tarpill

[11] Patent Number: 5,605,082
[45] Date of Patent: Feb. 25, 1997

[54] TOOL WITH INTEGRAL TORQUE DELIVERY SYSTEM

[75] Inventor: Andrew J. Tarpill, East Haddam, Conn.

[73] Assignee: Capewell Components Company, Cromwell, Conn.

[21] Appl. No.: 555,479

[22] Filed: Nov. 8, 1995

[51] Int. Cl.[6] .................................. B25B 23/157
[52] U.S. Cl. ................ 81/475; 81/58.1; 81/58.3
[58] Field of Search .......................... 81/475, 476, 473, 81/467, 58.1, 58.2, 58.3, 124.2, 125, 124.1, 58.4, 474

[56] References Cited

U.S. PATENT DOCUMENTS

| | | | |
|---|---|---|---|
| 1,299,764 | 4/1919 | Normoyle | 81/58.3 |
| 3,693,381 | 9/1972 | McGee | 81/474 |
| 4,054,067 | 10/1977 | Blank | 81/58.1 |
| 4,063,474 | 12/1977 | Klopping | 81/474 |
| 4,541,314 | 9/1985 | Korkowski | 81/58.1 |
| 4,869,139 | 9/1989 | Gotman | 81/475 |
| 4,964,319 | 10/1990 | Chang | 81/475 |
| 4,976,174 | 12/1990 | Walsh | 81/125 |

OTHER PUBLICATIONS

P. 15 of Applicant's product brochure showing Model PIT-1L, PIT-1AL and PIT-1B, Publication Date of Brochure Jun., 1989 (Ripley Company, Inc.; Utility Tool Div.).

*Primary Examiner*—D. S. Meislin
*Assistant Examiner*—Joni B. Danganan
*Attorney, Agent, or Firm*—DeLio & Peterson

[57] ABSTRACT

A tool for installing and removing load break probes, comprising a handle, a body rotatably attached to the handle, the body having an engagement device for non-rotatably engaging a load break probe, and a torque delivery system operatively connected between with the handle and the body. The torque delivery system has a first clutch half attached to the handle and a second clutch half attached to the body. The clutch halves are engaged up to a predetermined torque in a first direction and positively engaged when the tool is rotated in a second direction.

18 Claims, 2 Drawing Sheets

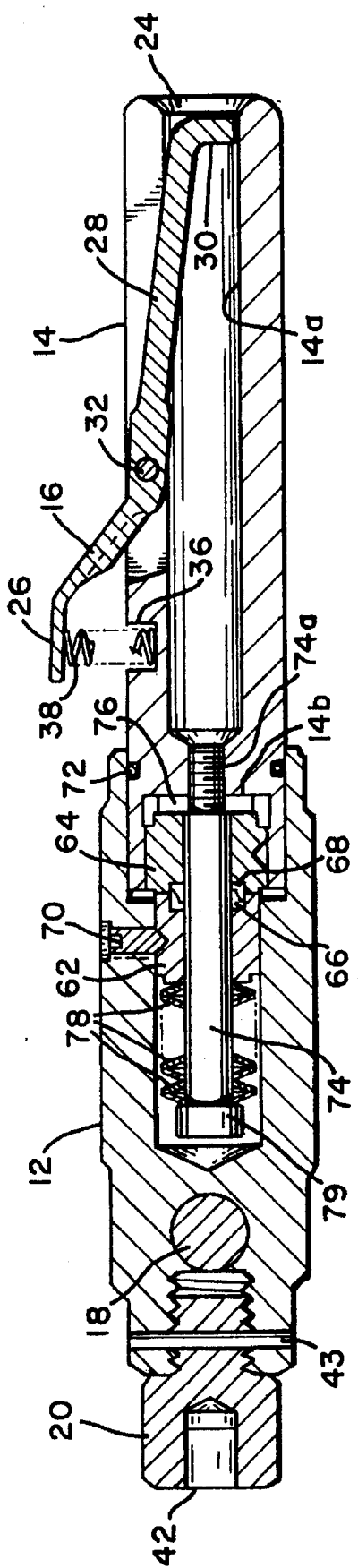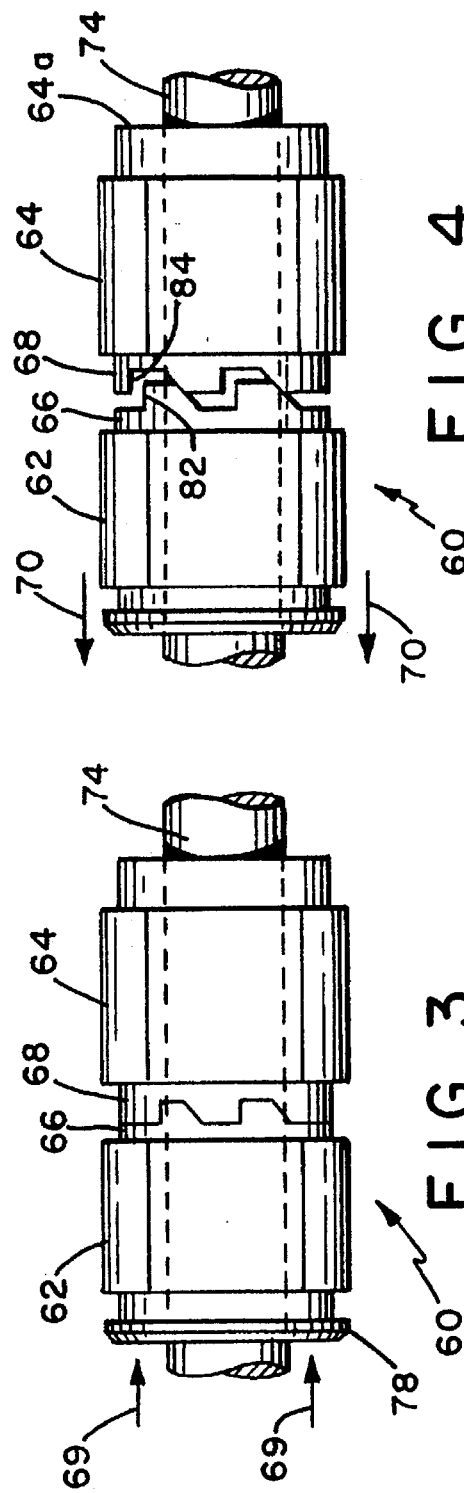

5,605,082

TOOL WITH INTEGRAL TORQUE DELIVERY SYSTEM

BACKGROUND OF THE INVENTION

1. Field of the Invention

The present invention relates to a tool for installing and removing load break probes.

2. Problem to be Solved

Load break probes used in elbow-type connectors are typically comprised of an elongated metallic portion, typically made of copper, coaxially attached to an elongated non-metallic portion, typically made of ceramic. The end of the metallic portion that is opposite the end attached to the ceramic portion is threadedly engaged with a mating connector that is attached to a cable and which is located within the elbow. The metallic member typically has an aperture or cavity that receives corresponding tabs of a tool used to remove and insert the probe. The non-metallic portion is known in the art as an "arc follower" or "arc probe follower". The non-metallic portion is susceptible to damage due to arcing which occurs when the load probe is inserted into the mating connector. Thus, the load probe must be periodically replaced. Conventional tools used to install the load probes typically include means for connecting the tool to an auxiliary torque wrench to permit the user to apply the proper torque when threadedly fastening the probe into the elbow. However, applying the torque wrench to the insertion tool is cumbersome and time consuming and also requires technicians to carry extra tools.

It is therefore an object of the present invention to provide a new and improved tool for installing and removing load break probes that has an integral torque delivery system.

It is another object of the present invention to provide a new and improved tool for installing and removing load break probes that can be manufactured at a reasonable cost.

It is a further object of the present invention to provide a new and improved tool for installing and removing load break probes that has an adapter that can be connected to a variety of tools to facilitate rotation of the tool.

SUMMARY OF THE INVENTION

The above and other objects and advantages, which will be apparent to those skilled in the art, are achieved in the present invention which is directed to, in a first aspect, a tool for installing and removing load break probes, comprising a handle, a body rotatably attached to the handle, the body having an engagement device for non-rotatably engaging a load break probe, and a torque delivery system operatively connected between the handle and the body, the system having a first clutch half attached to the handle and a second clutch half attached to the body, the clutch halves being engaged up to a predetermined torque in a first direction and positively engaged when the tool is rotated in a second direction.

In a related aspect, the present invention is directed to a tool for installing and removing load break probes, comprising a handle; a body having a bore therethrough sized for receiving a load break probe and defining a longitudinally extending slot, the body being rotatably attached to the handle; a resilient lever movable within the slot and pivotally attached to the body, the lever having a depressible portion adjacent an outer surface of the body and a projection positioned in the bore for engagement with a cavity formed in the load break probe; and a torque delivery system operatively engaged with the handle and the body, the system having a first clutch half attached to the handle and a second clutch half attached to the body, each clutch half having an engagement surface, the surfaces of the clutch halves being separably engaged, the surfaces becoming disengaged when a predetermined torque in a first direction is attained thereby allowing the handle to rotate while the body remains stationary, the surfaces being positively engaged when the tool is rotated in a second direction thereby allowing the handle and the body to rotate together.

In a further aspect, the present invention is directed to a tool for installing and removing load break probes, comprising a handle; a body having a bore therethrough sized for receiving a load break probe and defining a longitudinally extending slot, the body being rotatably attached to the handle; a resilient lever movable within the slot and pivotally attached to the body, the lever having a depressible portion adjacent an outer surface of the body and a projection positioned in the bore for engagement with a cavity formed in the load break probe; a torque delivery system operatively engaged with the handle and the body, the system having a first clutch half attached to the handle and a second clutch half attached to the body, each clutch half having a ramped surface, the system including a device for exerting a predetermined force upon the clutch halves to effect engagement of the ramped surfaces when the torque in a first direction is less than a predetermined torque, the ramped surfaces becoming disengaged when the predetermined torque in the first direction is attained thereby allowing the handle to rotate in the first direction while the body remains stationary, the ramped surfaces of the clutch halves being positively engaged when the tool is rotated in a second direction thereby allowing the handle and the body to rotate together; an elongate member transversely attached to the handle to facilitate manual rotation of the tool; and an adapter attached to an end of the handle that is opposite the body, the adapter being dimensionally configured for engagement with a first auxilary device for rotating the tool, the adapter having a recess coaxial with the handle and dimensionally configured for receiving a projection of a second auxilary device for rotating the tool.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is a side-view in cross-section of the tool of FIG. 1.

FIGS. 3 and 4 illustrate the operation of a torque delivery system of the tool of FIG. 1.

DESCRIPTION OF THE PREFERRED EMBODIMENTS

In describing the preferred embodiments of the present invention, reference will be made herein to FIGS. 1–6 of the drawings in which like numerals refer to like features of the invention.

Figure 6:
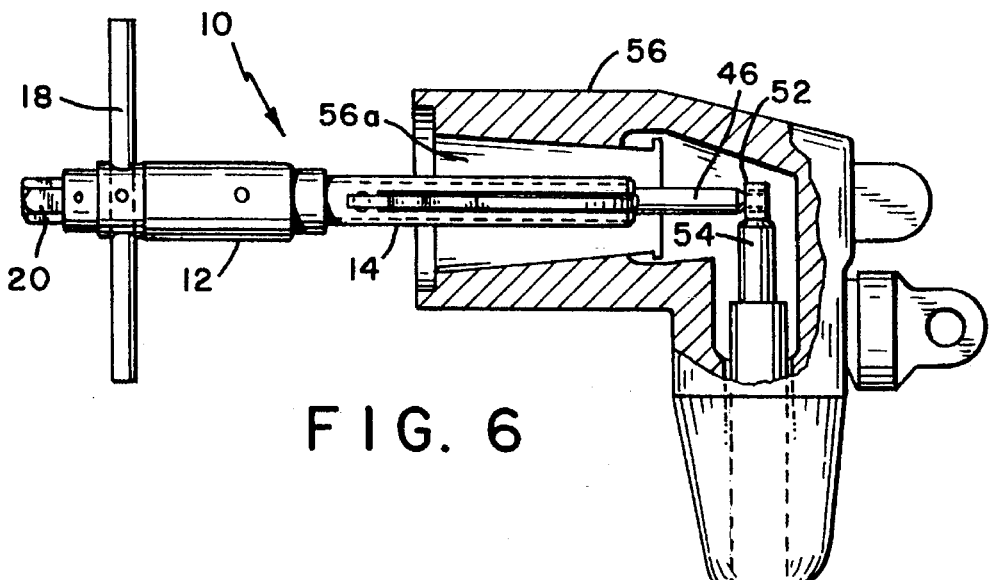
FIG. 6 is a partial cross-sectional view of the tool of FIG. 1 engaged with an elbow for installation of the load break probe depicted in FIG. 5.
Figure 5:
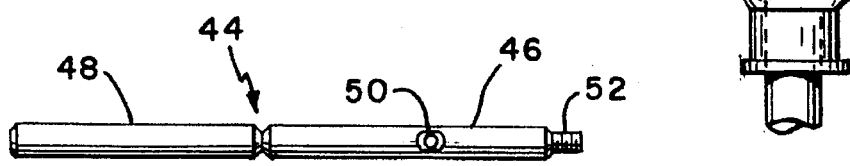
FIG. 5 is a side-view of a load break probe.

The tool of the present invention is to be used for installing and removing elongated load break probe 44 shown in FIG. 5. Probe 44 comprises metallic portion 46 and non-metallic portion 48. Typically, portion 46 is comprised of a conductive metal such as copper. Portion 46 has cavity 50 formed therein, the purpose of which will be described below. Portion 48 of probe 44 is typically comprised of ceramic. As shown in FIG. 6, one end of cable 54 is located within elbow 56 and has a connector attached thereto. The connector has a threaded bore for receiving threaded end 52 of probe 44.

Figure 1:
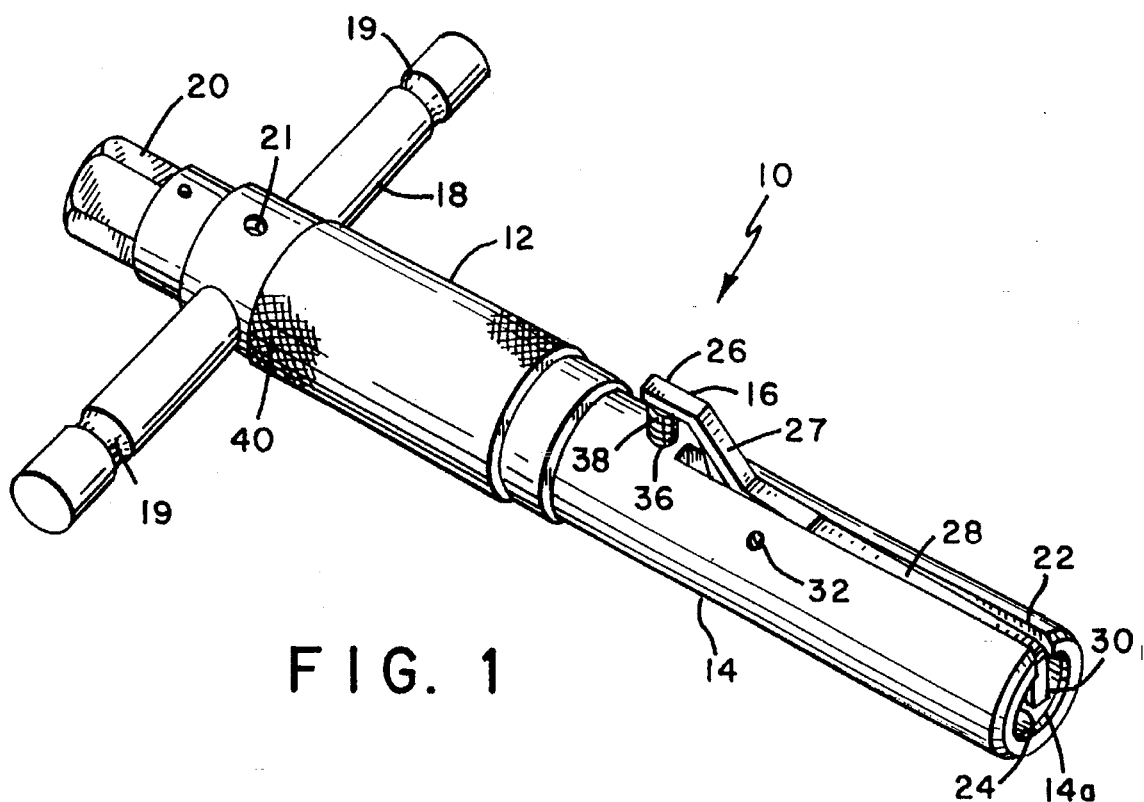
FIG. 1 is a perspective view of the tool of the present invention.

Referring to FIG. 1, tool 10 of the present invention comprises handle 12, body 14, lever 16, elongate member 18 and adapter 20. Handle 12 and body 14 are hollow and substantially cylindrical in shape. Handle 12 and body 14 are coaxially aligned with one another. A portion of body 14 is rotatably disposed within handle 12. Body 14 defines a longitudinally extending slot 22. Body 14 has opening 24 sized for receiving probe 44. Handle 12 has a textured surface 40 to provide friction when grasped by the user of tool 10.

Lever 16 is movable within slot 22 and is pivotally attached to body 14 via pin 32. Lever 16 comprises four (4) portions: first portion 26 which is positioned above the outer surface of body 14, angulated portion 27, elongated portion 28 located within the interior of body 14 and movable within slot 22, and end portion 30. Portion 26 is substantially flat for engagement with a finger, preferably the thumb, of a user. Portion 27 connects portions 26 and 28 together and is angulated with respect to portions 26 and 28. End portion 30 is contiguous to and angulated with respect to portion 28. Preferably, end portion 30 is angulated about 90° with respect elongated portion 28.

Body 14 defines cavity 36 for receiving one end of coiled spring 38. Coiled spring 38 is compressed between the bottom of portion 26 and a bottom surface of cavity 36 such that lever 16 is resilient and normally positioned to effect contact between end portion 30 and interior wall 14a of body 14. When portion 26 is depressed, end portion 30 is raised thereby breaking contact with inner wall 14a.

Referring to FIGS. 2–4, a torque delivery system integral with the tool 10 is shown. Torque delivery system 60 is disposed within handle 12 and comprises clutch halves 62 and 64. Clutch half 62 is disposed within and coaxially attached to handle 12. Clutch half 64 is disposed within and coaxially attached to body 14. Clutch halves 62 and 64 have substantially hexagonal shaped portions. The interior of handle 12 is substantially hexagonal shaped and is sized to receive the substantially hexagonally shaped portion of clutch half 62. Clutch half 62 is secured within the interior of handle 12 via fastening screw 70 which has an axis substantially perpendicular to the axis of the handle and engages a cavity formed in clutch half 62. Similiarly, the interior of body 14 has a portion thereof that is substantially hexagonally shaped and sized for receiving the substantially hexagonally shaped portion of clutch half 64.

Referring to FIGS. 2–4, clutch half 62 has ramped surface 66 circumferentially formed on one end thereof. Clutch half 64 has ramped surface 68 circumferentially formed on one end thereof. Shoulder screw 74 has a threaded portion 74a which is threadedly engaged to a corresponding threaded inlet in body 14. Shoulder screw 74 is coaxial with handle 12 and body 14. Shoulder screw 74 extends through clutch halves 62 and 64 Clutch halves 62 and 64 are rotatable about shoulder screw 74. Washer 76 is mounted on shoulder screw 74 adjacent threaded portion 74a and abuts interior wall 14b of body 14 and end 64a of clutch half 64. Washers 78 are mounted on shoulder screw 74 and abut end 79 of screw 74 and clutch half 62. Each washer 78 is a belleville-type washer. Each washer 78 has a corresponding spring constant or spring rate. The spring rates or spring constants of the individual washers 78 produce a resultant spring rate or constant. The resultant spring rate or constant of the plurality of washers 78 produces a predetermined amount of force, indicated by arrows 69, which is exerted upon clutch half 62 to effect engagement of ramped surfaces 66 and 68. The resultant spring rate and thus, the predetermined amount of force, can be varied by varying the number of washers 78 used. When a predetermined amount of torque having a clockwise orientation or direction is applied to handle 12, washers 78 are compressed to such a degree that ramped surfaces 66 and 68 disengage or separate as shown in FIG. 4 thereby allowing handle 12 to rotate in the clockwise direction while body 14 remains stationary. The separation or disengagement of clutch halves 62 and 64 causes handle 12 to move slightly outward in the direction indicated by the arrow 70. When the clutches actually disengage, an audible snapping sound is heard. This is caused by ramped surface 66 passing over ramped surface 68. Continued clockwise rotation results in repeated audible sounds. When the torque in the clockwise direction is less than the predetermined torque, the force exerted by washers 78 maintain the engagement of ramped surface 66 and 68.

The predetermined torque value is a function of the spring constant of the plurality of belleville washers 78, the length of shoulder screw 74 and the combined length of clutches halves 62 and 64. In a preferred embodiment, the predetermined torque value is about 125 in-lb. However, the aforementioned components may be configured to effect other torque values.

Rotating tool 10 in a counter-clockwise direction effects positive engagement of clutch halves 62 and 64 in a manner such that edges 82 and 84 of clutch halves 62 and 64, respectively, (see FIG. 4) contact one another. Edges 82 and 84 are substantially parallel to the longitudinal axis of tool 10. Thus, ramped surfaces 66 and 68 do not separate or disengage during counter-clockwise rotation.

Referring to FIG. 2, "O"-type ring 72 is positioned between handle 12 and body 14 to ensure that no foreign matter enters into the area where the clutch halves are located.

Elongate member 18 is disposed within a bore formed in handle 12 and is transverse or substantially perpendicular to the axis of handle 12. Member 18 provides the user with a grip for manually rotating tool 10. Screw 21 fastens member 18 to handle 12. The position of member 18 can be adjusted by loosening screw 21, and sliding member 18 such that screw 21 engages either of circumferential grooves 19 formed in member 18. Such a configuration allows the user to form a greater moment arm or lever when tool 10 is used in a confined space or if an additional mechanical advantage for rotation is required.

Adapter 20 comprises a nut and is coaxially attached to the end of handle 12 that is opposite the end that receives body 14. Adapter 20 is attached to handle 12 via roll pin 43. Preferably, the nut has a substantially hexagonal shape to enable engagement with a variety of wrenches, e.g., combination wrenches, adjustable wrenches, socket and slip joint pliers, etc. to faciliate rotation of tool 10. However, adapter 20 may be dimensionally configured to have other shapes.

Adapter 20 has recess 42 formed therein (see FIG. 2) for receiving a corresponding projection of a socket wrench. Preferably, recess 42 has a shape that is substantially square. However, recess 42 may be dimensionally configured to have other shapes.

Thus, member 18, adapter 20 and recess 42 provide three (3) different ways to effect rotation of tool 10.

THEORY OF OPERATION

When the user desires to insert probe 44 into elbow 56, the user depresses portion 26 of lever 16 to raise end 30. The user then inserts probe 44 into body 14 via opening 24 so that non-metallic portion 48 is completely disposed within body 14 and end 30 of lever 16 becomes lodged in cavity 50. The user then positions tool 10 so that metallic portion 46 of probe 44 is disposed within interior 56a of elbow 56 and threaded end 52 is engaged with a threaded inlet of a mating connector that is attached to wire 54. The user then rotates tool 10 clockwise so that end 52 becomes threadedly engaged with the mating connector. Washers 78 effect engagement of ramped surfaces 66 and 68. After threaded end 52 is threadedly engaged to the fullest extent within the threaded inlet of the mating connector, the user continues to rotate tool 10 clockwise until a predetermined amount of torque is attained. When the predetermined amount of torque is attained, ramped surfaces 66 and 68 of clutch halves 62 and 64, respectively, disengage or separate thereby allowing handle 12 to rotate while body 14 remains stationary. Thus, excess rotational force is never exerted upon probe 44 thereby preventing damage to probe 44 and the mating connector.

When the user desires to loosen or remove probe 44 from elbow 56, the user depresses portion 26 of lever 16 to raise end 30. The user then slides body 14 over non-metallic portion 48 of probe 44 and adjusts tool 10 until end 30 of lever 16 becomes lodged in cavity 50. The user then rotates tool 10 counter-clockwise which causes clutch half 62 to positively engage clutch half 64. The user continues to rotate tool 10 counter-clockwise until end 52 of probe 44 is completely disengaged from the mating connector.

Thus, the present invention provides a tool for installing and removing a load break probe that:

a) simplifies installation and removal of the probe;

b) prevents contamination of the load break probe;

c) reduces cross threading;

d) can provide the proper tightening forces as recommended by elbow manufacturers;

e) has an integral torque delivery system that can deliver a predetermined amount of torque; and f) provides three (3) ways of effecting rotation of tool 10, i.e. member 18, adapter 20 and recess 42.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for installing and removing load break probes, comprising:

a handle;

a body rotatably attached to the handle, the body having an engagement device for non-rotatably engaging a load break probe;

a torque delivery system operatively connected with the handle and the body, the system having a first clutch half attached to the handle and a second clutch half attached to the body, the clutch halves being engaged up to a predetermined torque in a first direction and positively engaged when the tool is rotated in a second direction, the torque delivery system further comprising a force exerting device for exerting a predetermined force upon the clutch halves to effect engagement of the clutch halves when the torque in the first direction is less than the predetermined torque; and an elongate member extending through the clutch halves, the elongate member having a first end attached to the body and a second end, the force exerting device being mounted on the elongate member between the second end and one of the clutch halves, the clutch halves being positioned between the force exerting device and the body.

2. The tool as set forth in claim 1 wherein each clutch half has a ramped surface, the ramped surfaces becoming disengaged when the predetermined torque in the first direction is attained thereby allowing the handle to rotate in the first direction while the body remains stationary, the ramped surfaces of the clutch halves being positively engaged when the tool is rotated in a second direction thereby allowing the handle and the body to rotate together.

3. The tool as set forth in claim 1 wherein the body is partially and rotatably disposed in the handle.

4. The tool as set forth in claim 3 wherein the torque delivery system is disposed within the handle.

5. The tool as set forth in claim 1 wherein the body has a bore therethrough sized for receiving the load break probe.

6. The tool as set forth in claim 5 wherein the body defines a longitudinally extending slot, the engagement device comprising a resilient lever movable within the slot and pivotally attached to the body, the lever having a depressible portion adjacent an outer surface of the body and a projection positioned in the bore for engagement with a cavity formed in the load break probe.

7. The tool as set forth in claim 6 wherein the projection comprises an angulated end of the lever.

8. The tool as set forth in claim 6 further comprising a spring interposed between the body and the depressible portion of the lever.

9. The tool as set forth in claim 1 further comprising an elongate member transversely attached to the handle to facilitate manual rotation of the tool.

10. The tool as set forth in claim 9 wherein the elongate member is adjustably attached to the handle.

11. The tool as set forth in claim 1 further comprising an adapter attached to an end of the handle that is opposite the body, the adapter being dimensionally configured for engagement with an auxilary device for rotating the tool.

12. The tool as set forth in claim 11 wherein the adapter has a shape that is substantially hexagonal.

13. The tool as set forth in claim 11 wherein the adapter has a recess coaxial with the handle and dimensionally configured for receiving a projection of a ratchet wrench.

14. The tool as set forth in claim 13 wherein the recess has a substantially square shape.

15. A tool for installing and removing load break probes, comprising:

a handle;

a body rotatably attached to the handle, the body having an engagement device for non-rotatably engaging a load break probe;

a torque delivery system operatively connected with the handle and the body, the system having a first clutch half attached to the handle and a second clutch half attached to the body, the clutch halves being engaged up to a predetermined torque in a first direction and positively engaged when the tool is rotated in a second direction, the torque delivery system further comprising a force exerting device for exerting a predetermined force upon the clutch halves to effect engagement of the clutch halves when the torque in the first direction is less than the predetermined torque, the force exerting device comprising at least one belleville washer; and an elongate member extending through the clutch halves, the elongate member having a first end attached to the body and a second end, the force exerting device being mounted on the elongate member between the second end and one of the clutch halves, the clutch halves being positioned between the force exerting device and the body.

16. A tool for installing and removing load break probes, comprising:

a handle;

a body having a bore therethrough sized for receiving a load break probe and defining a longitudinally extending slot, the body being rotatably attached to the handle;

a resilient lever movable within the slot and pivotally attached to the body, the lever having a depressible portion adjacent an outer surface of the body and a projection positioned in the bore for engagement with a cavity formed in the load break probe;

a torque delivery system operatively engaged with the handle and the body, the system having a first clutch half attached to the handle and a second clutch half attached to the body, each clutch half having an engagement surface, the surfaces of the clutch halves being separably engaged, the surfaces becoming disengaged when a predetermined torque in a first direction is attained thereby allowing the handle to rotate while the body remains stationary, the surfaces being positively engaged when the tool is rotated in a second direction thereby allowing the handle and the body to rotate together, the torque delivery system further comprising a force exerting device for exerting a predetermined force upon the clutch halves to effect engagement of the clutch halves when the torque in the first direction is less than the predetermined torque; and an elongate member extending through the clutch halves, the elongate member having a first end attached to the body and a second end, the force exerting device being mounted on the elongate member between the second end and one of the clutch halves, the clutch halves being positioned between the force exerting device and the body.

17. The tool as set forth in claim 16 wherein the engagement surface of each clutch half comprises a ramped surface, the ramped surfaces becoming disengaged when the predetermined torque in the first direction is attained thereby allowing the handle to rotate in the first direction while the body remains stationary, the ramped surfaces of the clutch halves being positively engaged when the tool is rotated in a second direction thereby allowing the handle and the body to rotate together.

18. A tool for installing and removing load break probes, comprising:

a handle;

a body having a bore therethrough sized for receiving a load break probe and defining a longitudinally extending slot, the body being rotatably attached to the handle;

a resilient lever movable within the slot and pivotally attached to the body, the lever having a depressible portion adjacent an outer surface of the body and a projection positioned in the bore for engagement with a cavity formed in the load break probe;

a torque delivery system operatively engaged with the handle and the body, the system having a first clutch half attached to the handle and a second clutch half attached to the body, each clutch half having a ramped surface, the system including a device for exerting a predetermined force upon the clutch halves to effect engagement of the ramped surfaces when the torque in a first direction is less than a predetermined torque, the ramped surfaces becoming disengaged when the predetermined torque in a first direction is attained thereby allowing the handle to rotate in the first direction while the body remains stationary, the ramped surfaces of the clutch halves being positively engaged when the tool is rotated in a second direction thereby allowing the handle and the body to rotate together, the torque delivery system further comprising a force exerting device for exerting a predetermined force upon the clutch halves to effect engagement of the clutch halves when the torque in the first direction is less than the predetermined torque;

an elongate member extending through the clutch halves, the elongate member having a first end attached to the body and a second end, the force exerting device being mounted on the elongate member between the second end and one of the clutch halves, the clutch halves being positioned between the force exerting device and the body;

a member transversely attached to the handle to facilitate manual rotation of the tool; and an adapter attached to an end of the handle that is opposite the body, the adapter being dimensionally configured for engagement with a first auxilary device for rotating the tool, the adapter having a recess coaxial with the handle and dimensionally configured for receiving a projection of a second auxilary device for rotating the tool.

* * * * *